(12) United States Patent  (10) Patent No.: US 7,842,116 B2
Simmons  (45) Date of Patent: Nov. 30, 2010

(54) AIR INTAKE FILTER SCREEN ASSEMBLY

(75) Inventor: Randy Simmons, West Chester, OH (US)

(73) Assignee: The Newway Company, Commerce Township, MI (US)

( * ) Notice: Subject to any disclaimer, the term of this patent is extended or adjusted under 35 U.S.C. 154(b) by 1046 days.

(21) Appl. No.: 10/870,608

(22) Filed: Jun. 17, 2004

(65) Prior Publication Data

US 2005/0279063 A1   Dec. 22, 2005

(51) Int. Cl.
 *B01D 46/00* (2006.01)
(52) U.S. Cl. .......................................... 55/480; 55/493
(58) Field of Classification Search ................... 55/495, 55/496, 491, 493, 511, DIG. 31, 480; 210/162, 210/169
See application file for complete search history.

(56) References Cited

U.S. PATENT DOCUMENTS

| | | | |
|---|---|---|---|
| 2,562,677 A * | 7/1951 | Nolan | 24/27 |
| 3,373,546 A * | 3/1968 | Setnan | 55/501 |
| 3,413,782 A * | 12/1968 | Bartlett | 55/485 |
| 4,288,992 A | 9/1981 | Eliason | 62/256 |
| 4,297,046 A * | 10/1981 | McGill | 403/46 |
| 4,340,402 A * | 7/1982 | Catron | 55/487 |
| 4,604,114 A * | 8/1986 | Ward | 96/222 |
| 4,905,089 A * | 2/1990 | Liang et al. | 348/819 |
| 5,266,090 A | 11/1993 | Burnett | 55/333 |
| 5,365,991 A * | 11/1994 | Wright et al. | 160/84.04 |
| 5,370,722 A | 12/1994 | Simmons | 55/351 |
| 5,525,145 A | 6/1996 | Hodge | 96/17 |
| 5,529,593 A | 6/1996 | Simmons | 55/354 |
| D402,356 S | 12/1998 | Hodge | D23/365 |
| 5,904,744 A | 5/1999 | Kagan | 55/385.1 |
| 6,174,340 B1 | 1/2001 | Hodge | 55/385.1 |
| 6,197,077 B1 * | 3/2001 | Simmons et al. | 55/351 |
| 6,279,335 B1 | 8/2001 | Jacobs | 62/249 |
| 6,527,838 B2 | 3/2003 | Volo | 96/134 |
| 6,652,748 B1 * | 11/2003 | Choi | 210/232 |
| 6,793,715 B1 * | 9/2004 | Sandberg | 95/273 |
| 2003/0070769 A1 | 4/2003 | Lampers | 160/113 |

FOREIGN PATENT DOCUMENTS

JP  2001-174018  * 6/2001

* cited by examiner

*Primary Examiner*—Duane Smith
*Assistant Examiner*—Ives Wu
(74) *Attorney, Agent, or Firm*—Gifford, Krass, Sprinkle, Anderson & Citkowski, P.C.

(57) ABSTRACT

A filter screen assembly for use with an air intake structure, the structure including a face within which is formed an air intake opening. The filter screen assembly includes a screen having a flexible mesh material and an outer perimeter edge. The perimeter edge is secured at specified locations to the face of the air intake structure, and in order to filter out contaminants associated with an air stream entering the intake structure and to prevent the screen from being drawn into the air intake opening.

1 Claim, 6 Drawing Sheets

AIR INTAKE FILTER SCREEN ASSEMBLY

BACKGROUND OF THE INVENTION

1. Field of the Invention

The present invention relates generally to filter screen assemblies and, more specifically, to an air filter screen assembly in use with an intake of an associated structure, such as an industrial cooling tower, HVAC structure, or the like.

2. Description of the Prior Art

The prior art is well documented with examples of filter assemblies, and in particular those in use with air intake structures. The objective in such instances is to provide an effective screen covering for a structural air intake, and such as in particular a cooling tower or other similar industrial based structure.

A first example drawn from the prior art is disclosed in U.S. Pat. No. 5,370,722, issued to Simmons, which teaches a filtering assembly for protecting an air intake of a structure and including a flexible screen mounted so as to cover the air intake. The screen is selectively moved in either of opposite directions, such as through application of first and second pulley assemblies located on opposite sides of the screen which are engaged by pull ropes to raise and lower the screen. A container is located at a base of the structure, beneath the intake opening, and stores the flexible screen when not in use.

In a second preferred embodiment, first and second containers are secured to the structure at locations above and below the intake opening. The flexible screen is formed as first and second interconnected and cylindrical rolls placeable within the containers and operable by a crank to advance an intermediate, unrolled and interconnected portion of the screen across the intake opening.

A further example of the prior art is disclosed in U.S. Pat. No. 6,197,077, also issued to Simmons, and disclosing a filter screen assembly mounted over an air intake structure having a height, width and depth and which defines a selected face within which the air intake opening is formed. A planar and flexible filtration screen defines a substantially rectangular shape with top, bottom and first and second side edges. Fasteners are provided for securing the sides of the screen to corresponding sides of the intake structure and include eyelets formed within the screen which are supported upon tubular portions extending from the structure and fasteners which secure within the tubular portions to affix the screen in place.

In a preferred embodiment, a stiffening and engaging bar associated with a top edge of the flexible screen includes upwardly extending hooks 36 and 38 which are secured upon an engaging bar mounted in extending fashion along a top edge of the structure. A side extending engagement of the screen is facilitated by collars secured to the edges of the air intake structure and to which eyelets formed along the screen edges are aligned and secured thereover through the further addition of screws or the like.

U.S. Pat. No. 6,279,335, issued to Jacobs, teaches a refrigerated case cover having a cover sheet constructed of an insulating material and having air cells sandwiched between an outer cover sheet and an inner cover sheet. Eyelets are disposed along the top and bottom edges of the cover and a cord is woven through the lower eyelets. A male tab is disposed on each cover sheet side and the cover is attached to a refrigerated case by attaching the upper eyelets to an upper case front lip by means of S hooks, and attaching the cord to grille spokes disposed along a lower case front upper edge with S hooks, and by attaching each cover sheet side to a respective case side with hook-and-loop material. In an alternate embodiment, a refrigerated case cover has weights disposed along the cover sheet lower edge in order to keep the refrigerated case cover sealed against a refrigerated case lower front, and to expedite installation and removal of the refrigerated case cover.

SUMMARY OF THE PRESENT INVENTION

The present invention is a filter screen assembly for use with an air intake structure, such as typically a cooling tower, HVAC structure or the like. The filter screen or netting assembly is intended to be quick and easy to install and to specifically reduce the amount of work required for installation and removal as needed.

In each of the preferred embodiments, a screen is constructed of a mesh (typically flexible) material and including an outer perimeter edge. The perimeter edge is secured at specified locations to the face of the air intake structure, such as to filter out contaminants associated with an air stream entering the intake structure and to prevent the screen from being drawn into the air intake opening.

The intake structure typically includes a face within which is formed the air intake opening. In a first preferred embodiment, first and second rods extend along the air intake face and in proximity to the intake opening. Fasteners extend from the perimeter edge of the screen for engaging the rods, such as including snap hooks, rings or straps.

A number of apertures may also be formed at locations along the perimeter edge and through which is engaged other fasteners (e.g., screws, bolts, snaps, hooks, stud adapters, button mechanisms and the like) in order to provide additional engagement of the filter screen to the air intake face and to again prevent the screen from being drawn into the intake opening in use.

In a further embodiment, the perimeter extending mounting fasteners may provide the sole means for securing the perimeter edge to the face of the air intake structure and, in a yet further application, it is envisioned that the fasteners and mounting apertures can be substituted by hook-and-loop fasteners established between the inner facing surface of the perimeter edge and an outer facing surface of the air intake face and in order to reasonably secure the filter screen assembly.

A yet additional preferred embodiment contemplates the use of spring-loaded and gripping clamps secured to locations of the air intake face in order to grip the perimeter edge of the filter screen assembly over the air intake opening. The screen may further include one or more axially extending and stiffening elements associated with the perimeter edge and which are gripped by the clamps in order to be secured in place.

An additional embodiment contemplates providing elongate extending cables or rods, along such as either two or four extending perimeter edges of the screen assembly, and which are typically threaded through looped edges of the screen. To provide for selective loosening or tensioning of a given edge of the screen assembly, a turnbuckle is positioned between a selected one of the mounting locations and an associated end of a given cable. In a still further arrangement, the perimeter edge may be constructed as outer and inner frame portions, and between which is sandwichingly engaged the mesh material.

BRIEF DESCRIPTION OF THE DRAWINGS

Reference will now be made to the attached drawings, when read in combination with the following detailed description, wherein like reference numerals refer to like parts throughout the several views, and in which:

FIG. 1A is a partial view of an edge of a screen, such as illustrated in FIG. 1, and illustrating examples of hooks, snap hooks, rings or other looping fasteners that attach to the rod or cable and which can be utilized in substitution of the straps in FIG. 1;

DETAILED DESCRIPTION OF THE PREFERRED EMBODIMENTS

Figure 1:
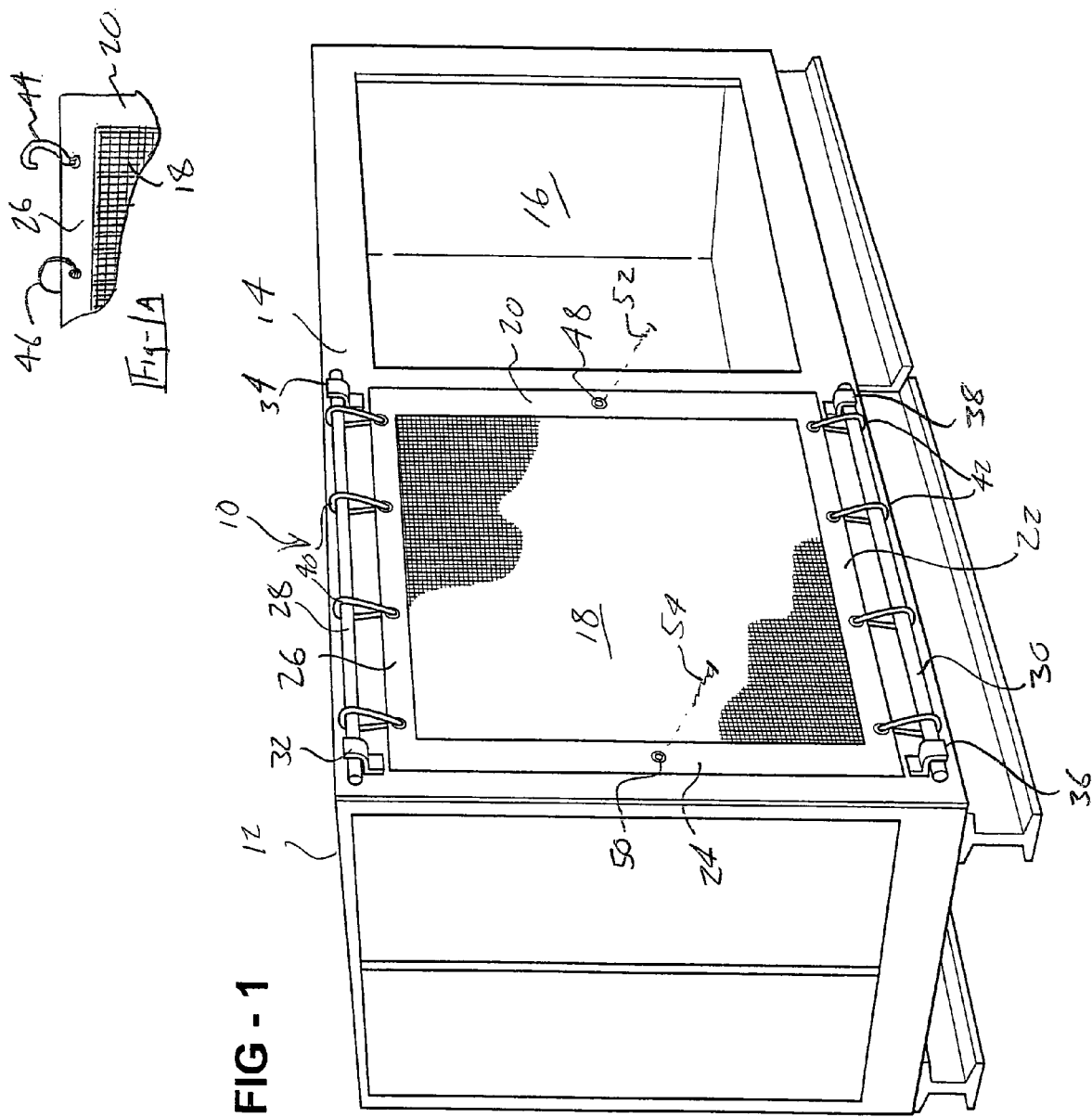
FIG. 1 is a perspective view of a filter screen assembly for use with an air intake structure according to a first preferred embodiment of the present invention.

Referring now to FIG. 1, a filter screen assembly is illustrated generally at 10 in use with an air intake structure 12 and according to a first preferred embodiment of the present invention. As previously described, the air intake structure 12 can include such as a cooling tower, HVAC structure, or the like and which in each instance includes at least one facing surface 14, within which is formed an air intake opening, see further by example at 16 in FIG. 1, and in addition to an identical air intake opening obscured by the filter screen assembly 10.

Referring again to FIG. 1, the filter screen assembly 10 includes a screen 18 constructed of a mesh (typically flexible) material and including an outer perimeter edge. In the preferred embodiments illustrated, the screen exhibits a rectangular, or four-sided, configuration, and with interconnected perimeter edges 20, 22, 24 and 26. It is further understood that an outer configuration exhibiting any number of sides, ranging from a three-sided triangle to a circular-shaped filter (this exhibiting an infinite number of sides) is possible within the scope of the invention. The outer perimeter edge may further include, without limitation, a reinforced stitching, another material which compliments the central mesh screen 18 or, as will be further described, provision of a stiffening or other type of reinforcing portion to provide strength and/or rigidity about the outer periphery of the screen assembly.

The perimeter edge is secured at specified locations to the face of the air intake structure, such as to filter out contaminants associated with an air stream entering the intake structure and to prevent the screen from being drawn into the air intake opening in use. In the first illustrated embodiment, first and second rods 28 and 30 extend along the air intake face and in proximity to the associated intake opening. The rods 28 and 30 can be supported or secured in any desired fashion, and such as is illustrated by being welded or otherwise secured to end brackets, see at 32 and 34 for rod 28 and further at 36 and 38 for rod 30. The cables or rods can also be mounted vertically left and right.

Fasteners extend from the perimeter edges, in this case top edge 26 and bottom edge 30 of screen 18, and which are engageable with the rods 28 and 30. In the example illustrated, upper straps 40 and lower straps 42 engage the rods 28 and 30, respectively, and to establish the screen 18 in a generally taut manner over the air intake opening. Additional types of fasteners, capable of being substituted for the upper and lower straps 40 and 42, may alternately be provided and which, as illustrated in FIG. 1A, can include such as including snap hooks 44, rings 46 and the like.

A number of apertures may also be formed at locations along the perimeter edge, and such as which are illustrated in FIG. 1 by aperture 48 formed in perimeter edge 20 and aperture 50 in perimeter edge 24. Although only a single aperture 48 and 50 is illustrated along each of extending sides 20 and 24, it is envisioned that any number of apertures can be provided along any or all of the four extending perimeter edges and through which are engaged fasteners such as screws, bolts, snaps, hooks, stud adapters, button mechanisms and the like (see for example at 52 and 54) in order to provide additional engagement of the filter screen to the air intake face and to again prevent the screen from being drawn into the intake opening in use.

Figure 2:
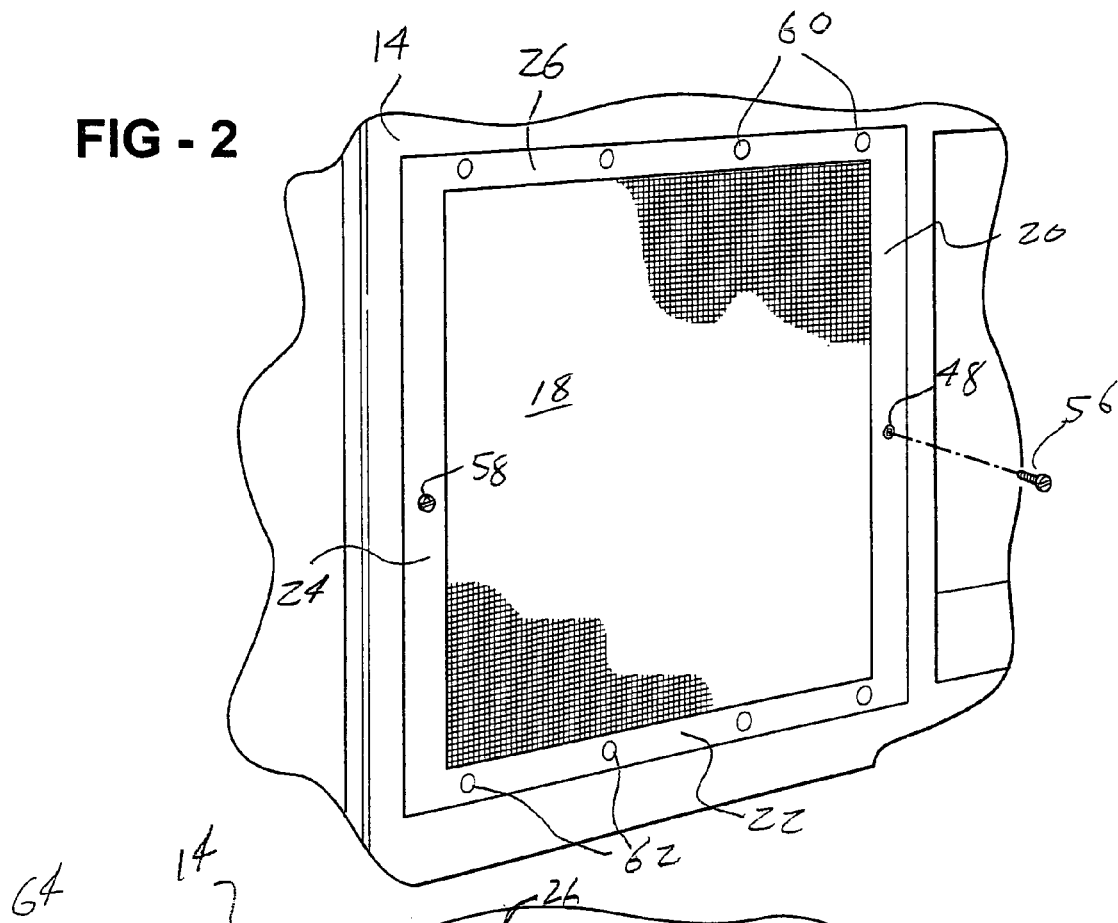
FIG. 2 is a sectional perspective of a filter screen assembly according to a second preferred embodiment.

In the further illustrated embodiment of FIG. 2, the perimeter extending mounting fasteners, see bolts 56 and 58, may provide the sole means for securing the perimeter edge to the face of the air intake structure. The upper straps 40 and lower straps 42 as shown in FIG. 1 are illustrated removed from the respective upper 26 and lower 22 perimeter edges and by which upper extending apertures 60 and lower extending apertures 62 are clearly illustrated. It is envisioned that additional bolts, screws, or other available fasteners may be inserted through upper 60 and lower 62 spaced apart apertures in order to secure the filter screen assembly to the air intake face 14.

Figure 3:
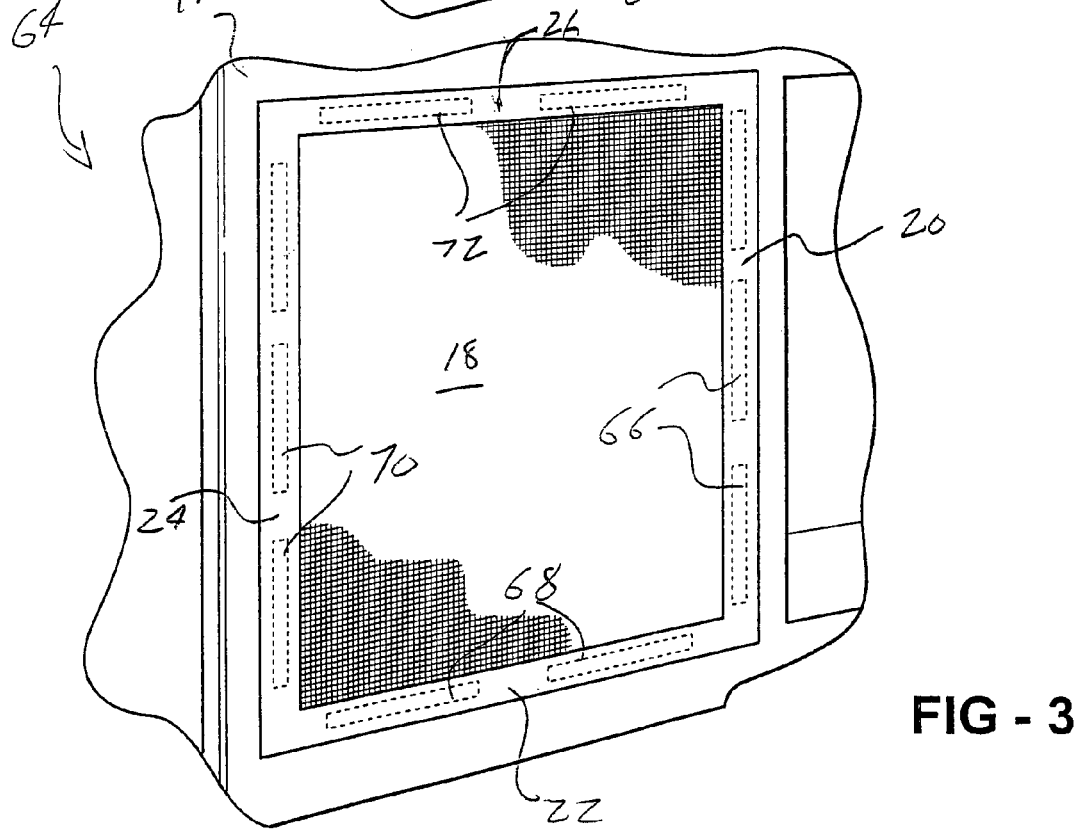
FIG. 3 is a sectional perspective of a filter screen assembly according to a third preferred embodiment of the present invention.

Referring to FIG. 3, and in a yet further application 64, it is envisioned that the fasteners and mounting apertures can be substituted by hook-and-loop fasteners, see at 66, 68, 70 and 72 for each of perimeter edges 20, 22, 24 and 26, respectively. The hook-and-loop fasteners are commercially best known as releasably engageable Velcro® portions and which are established between the inner facing surfaces of the interconnected perimeter edges and the outer facing surface 14 of the air intake face, in order to releasably secure the filter screen assembly in place.

Figure 4:
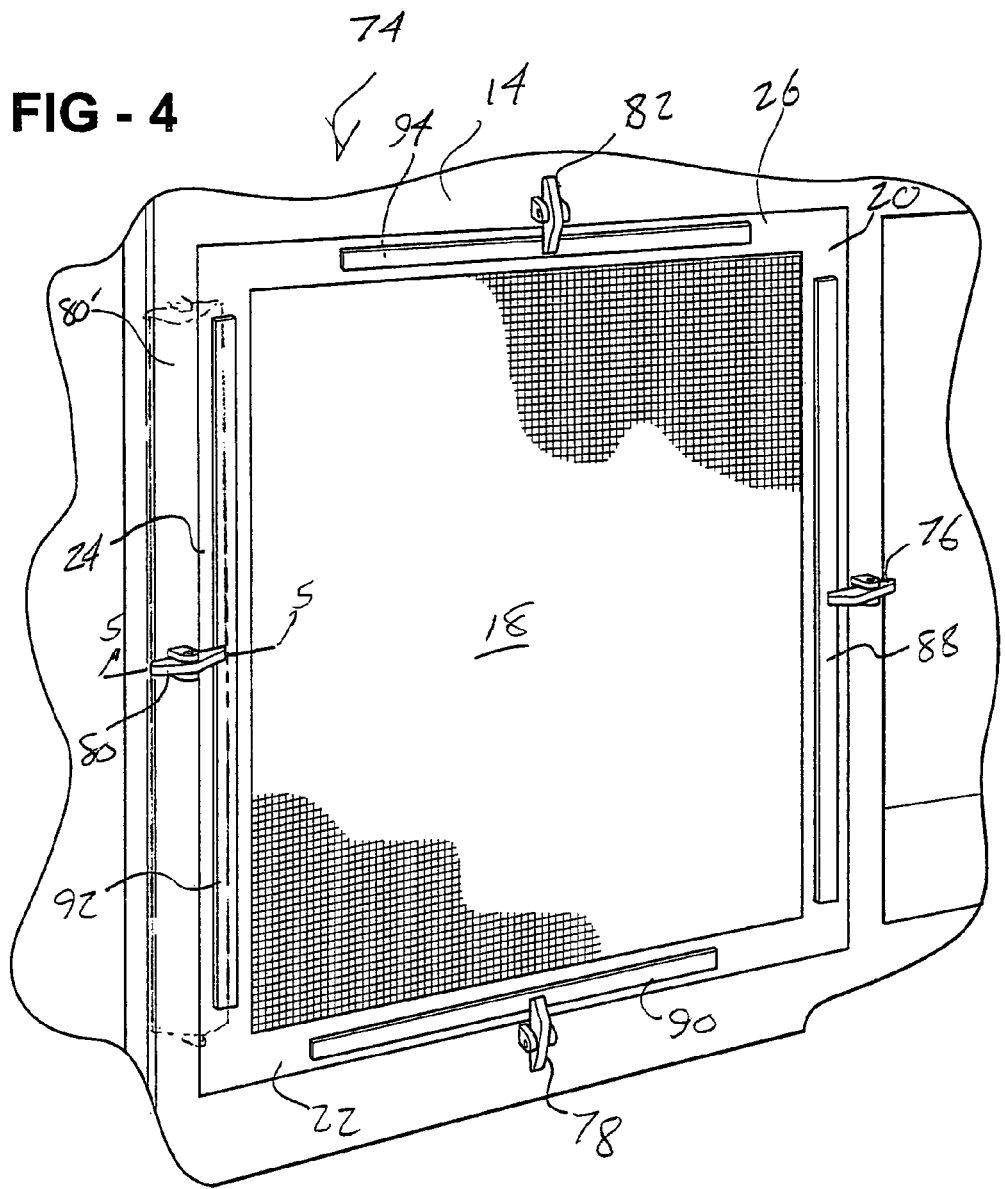
FIG. 4 is a sectional perspective of a filter screen assembly according to a fourth preferred embodiment of the present invention.

Referring now to FIG. 4, a yet additional preferred embodiment is illustrated generally at 74 and contemplates the use of spring-loaded and gripping clamps, see at 76, 78, 80 and 82, secured to locations of the air intake face 14 in order to grip the interconnected perimeter edges 20, 22, 24 and 26 of the filter screen assembly over the air intake opening. As is also illustrated in the cutaway illustration of FIG. 5, each of the clamps (and referencing in particular clamp 80 associated with extending perimeter edge 24) includes a spring-loaded arm (see coil spring 84) securing the clamp in pivotal and biasing fashion to a pedestal 86, and which is in turn secured to a location along the face 14 of the intake structure. In an alternate variant (not shown), each clamp may consist of two sections in which screws go through the top and/or bottom sections of the clamp.

The screen may further include one or more axially extending and stiffening elements (these typically consisting of a rigidized metal, plastic, nylon or like material) associated with the perimeter edge and which are gripped by the clamps 76, 78, 80 and 82 in order to be secured in place. In particular, stiffening elements 88, 90, 92 and 94 are shown secured to perimeter edges 20, 22, 24 and 26, respectively. As illustrated in FIG. 4, the stiffening elements 88, 90, 92 and 94 are secured (adhesively or mechanically) to exterior facing sides of the perimeter edges 20, 22, 24 and 26.

Figure 5:
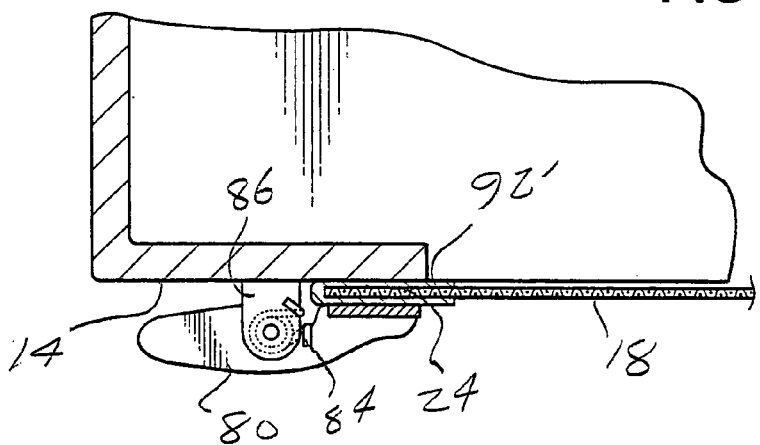
FIG. 5 is a cutaway view taken along line 5-5 of FIG. 4 and showing the nature of the application of clamping pressure to reinforced edge locations of the filter screen according to the present invention.

As further illustrated in the sectional cutaway of FIG. 5, the stiffening element can comprise a folded perimeter extending element, see at 92', which sandwiches about the associated perimeter edge 24 of the screen. As is also illustrated in FIG. 4, a lengthened phantom illustration 80' is shown of the clamp 80 and which is intended to illustrate a further variant of the invention by which the clamps are understood to be capable of extending substantially a full length of each perimeter extending side and which sandwiches the filter edge along the substantial length. It is further understood that the stiffening elements and clamps can be used alternately or not at all within the scope of the invention.

Figure 6:
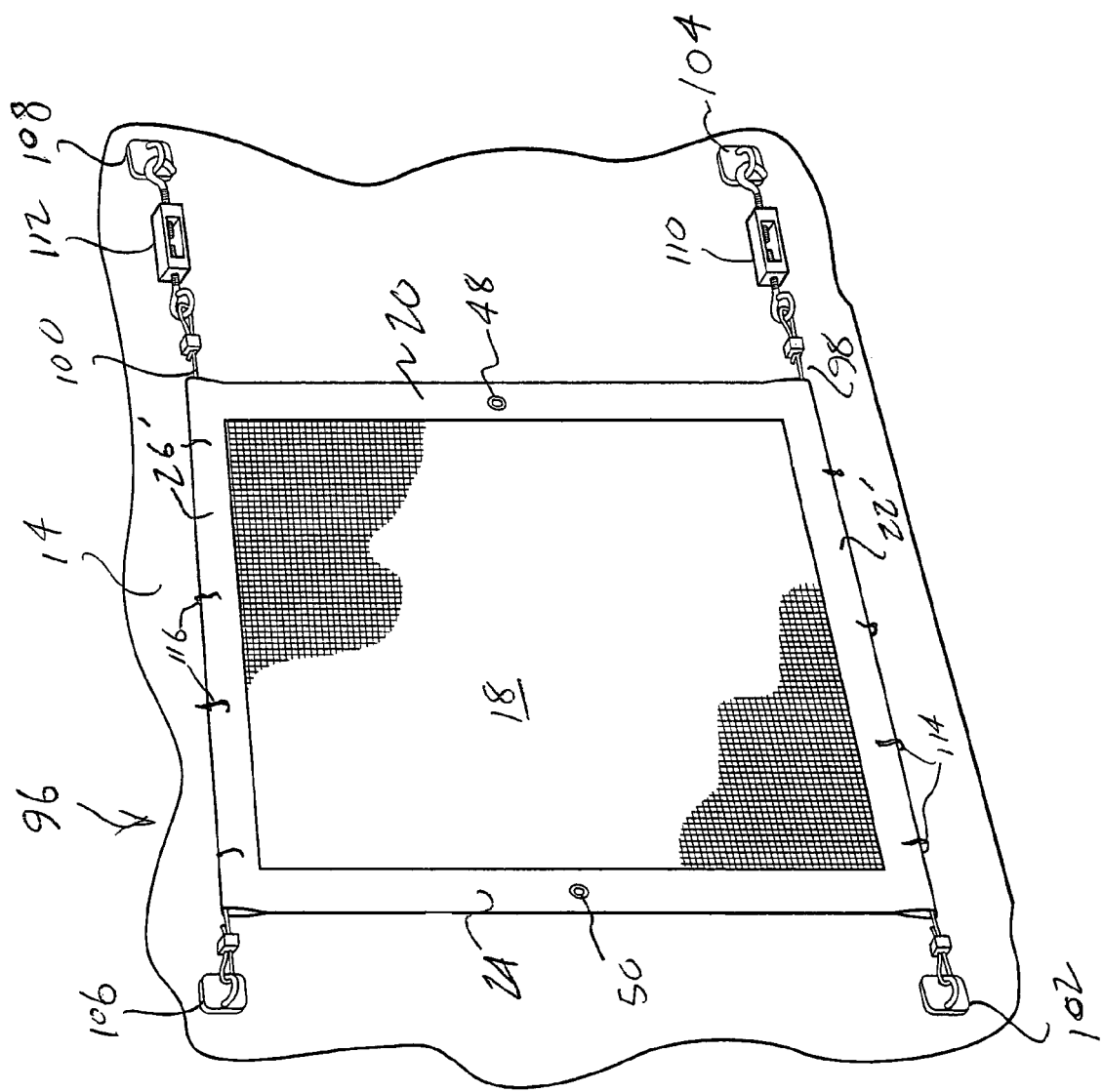
FIG. 6 is a further sectional illustration of a filter screen assembly according to a fifth preferred embodiment and illustrating first and second tensioning cables or rods extending horizontally along both top and bottom or left and right edges of the filter screen.

Referring now to FIG. 6, an additional embodiment is illustrated at 96 of a modified screen assembly by which upper 26' and lower 22' interconnected and perimeter extending edges of the screen include looped extending edges. Threaded through these edges are extending portions of cables 98 and 100, these in turn being secured at opposite ends to eyebolts (see at 102 and 104 for cable 98 and further at 106 and 108 for cable 100) and such that the cables extend along both the top and bottom locations of the air intake face 14 in proximity to the intake opening. This embodiment calls for attachment to either vertically or horizontally mounted cables or rods using snap hooks or other looping attachment mechanism. Turnbuckles may be eliminated, and instead the ends of the cable can thread through the eyebolt whereby it is pulled taut and folded back onto itself whereby it is held in the taut position using cable clamps.

To provide for selective loosening or tensioning of a given edge of the screen assembly, a turnbuckle, see at 110 for cable 98 and 112 for cable 100, is positioned between a selected one of the mounting locations (see eyebolt mounting locations 104 and 108) and an associated end of a given cable, again at 98 and 100. It is also envisioned that the corresponding perimeter edges 22' and 26' of the screen assembly may be secured to the cables 98 and 100, such as by clips 114 and 116, in order to tension the edges of the screen along with the cables.

Figure 7:
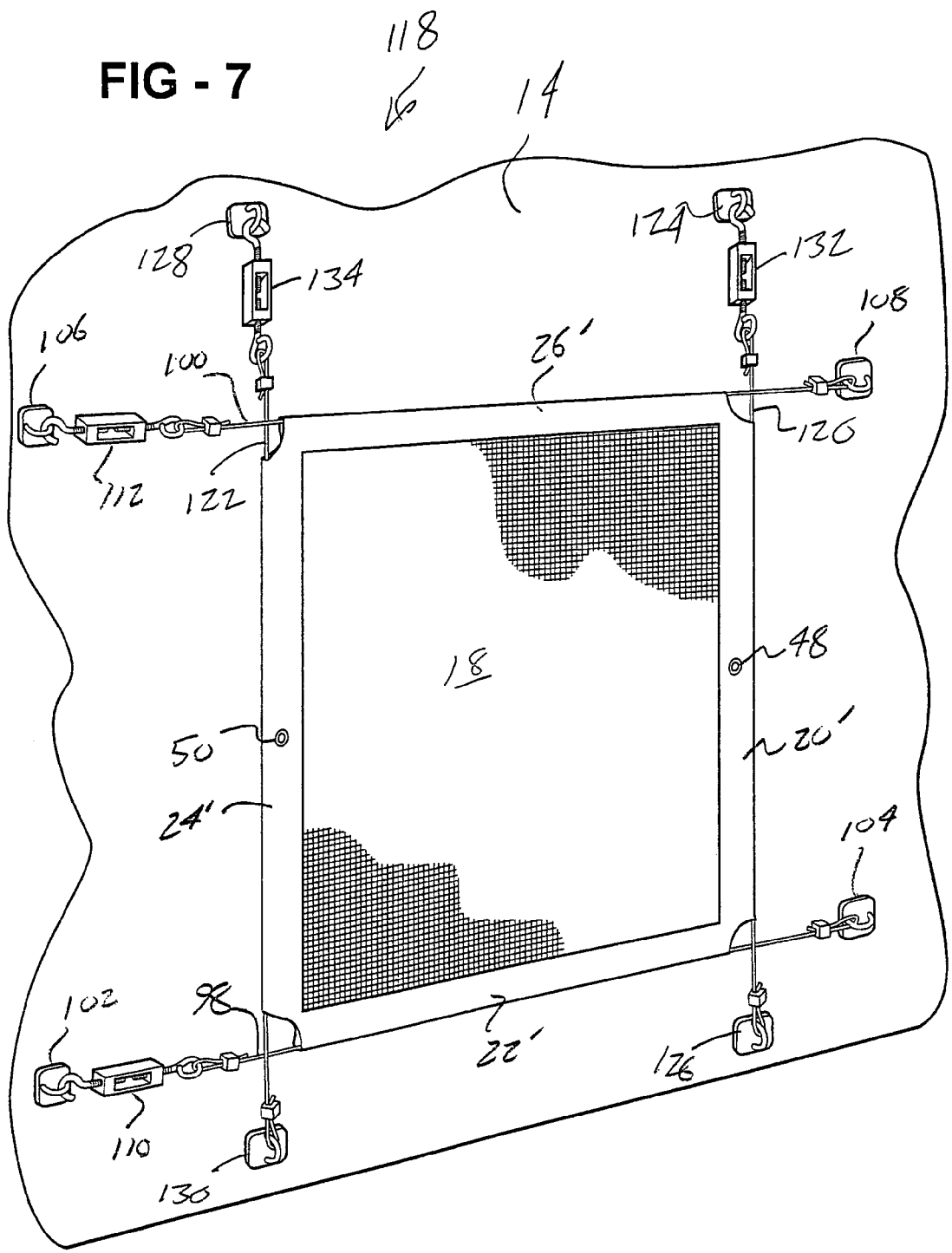
FIG. 7 is a yet further sectional illustration of a variation of the fifth preferred embodiment, shown in FIG. 6, and illustrating an additional and second pair of tensioning cables or rods extending vertically or horizontally along opposite side edges of the filter screen.

Referring to FIG. 7, a variant 118 of the embodiment 96 contemplates the provision of two pairs of extending cables, including again first pair of cables 98 and 100 extending along top and bottom edges of the air intake surface 14, and in addition to a second pair of cables 120 and 122 extending along edges corresponding to modified and looped perimeter edges 20' and 24' associated with the screen 18. As with the first pair of cables, eyebolts 124 and 126 engage opposite ends of the cable 120 and eyebolts 128 and 130 likewise engage opposite ends of cable 122. Turnbuckle assemblies 132 and 134 are again disposed between associated ends of the cables 120 and 122 and the eyebolts 124 and 128, respectively.

Figure 8:
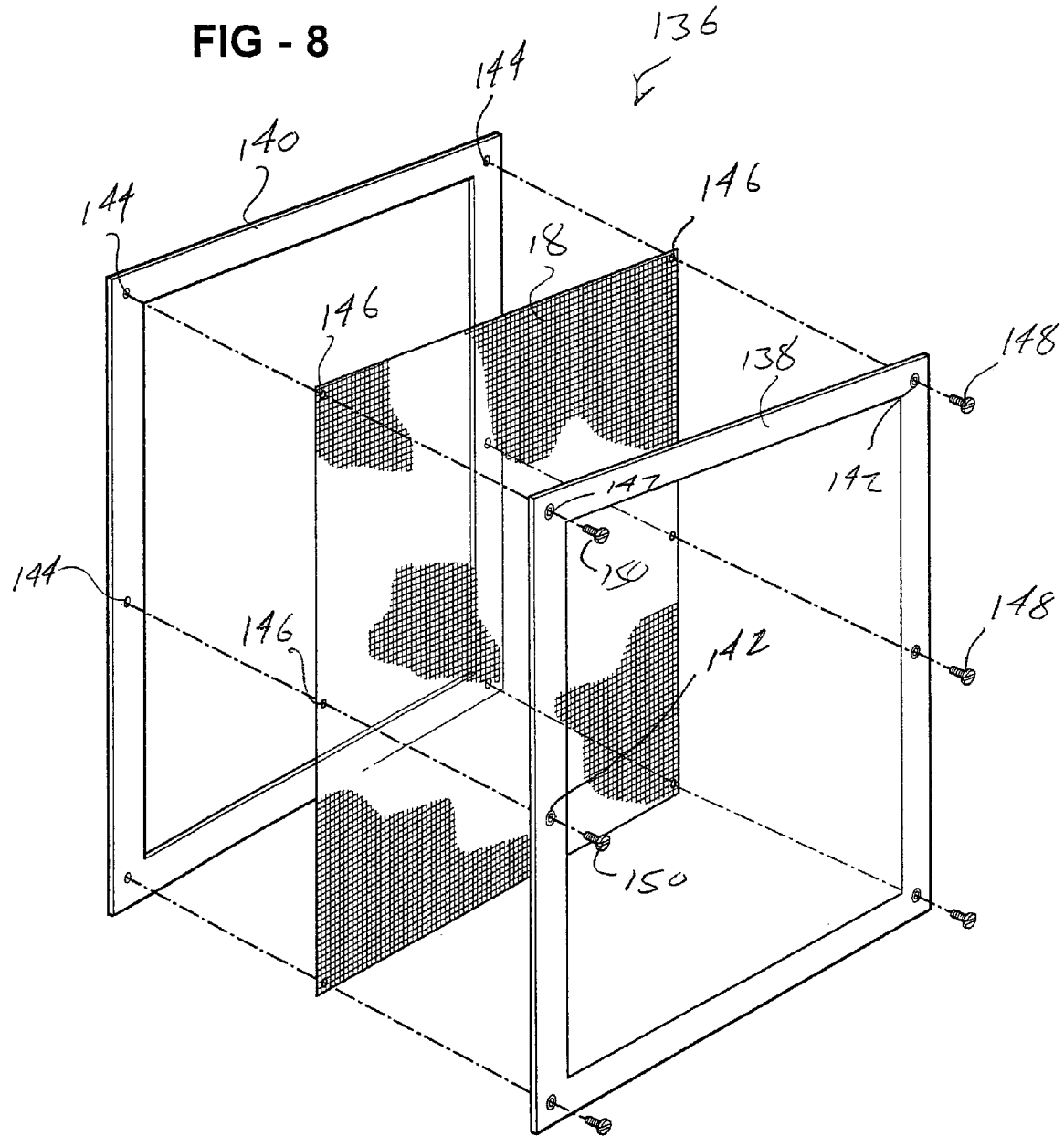
FIG. 8 is an exploded view of a filter screen assembly according to a sixth preferred embodiment of the present invention.

In a further arrangement 136, and referencing finally FIG. 8, a filter screen assembly is illustrated in exploded fashion and without reference to any given air intake structure. A flexible mesh is again referenced at 18, about a perimeter extending edge of which is sandwiched outer 138 and inner 140 frame portions. Apertures are located at 142 at spaced locations about a periphery of the outer frame 138 and aligning fasteners 144 are likewise formed at spaced locations about the inner frame 140. These coincide with apertures 146 formed in aligning locations about a perimeter of the mesh 18 and which receive fasteners 148 and 150 to secure the sandwiched construction together and in place over the face 14 of the air intake structure.

Having described our invention, other and additional preferred embodiments will become apparent to those skilled in the art to which it pertains and without deviating from the scope of the appended claims.

I claim:

1. A filter screen assembly for use with an air intake structure, the structure including a face within which his formed an air intake opening, said filter screen assembly comprising:

a screen including a mesh material with an outer perimeter edge;

a plurality of axially extending stiffening elements secured to extending locations of said perimeter edge;

a plurality of clamps associated with each extending side of said perimeter edge, each of said clamps each further comprising a biasing arm extending from an outer facing surface of the intake structure and being engageable to grip a selected one of said stiffening elements; and said perimeter edge being secured at specified locations against the face of the air intake structure in order to prevent the admittance of air bypassing the mesh material, to filter out contaminants associated with an air stream entering the intake structure, and to prevent said screen from being drawn into the air intake opening.

* * * * *